US009731354B2

(12) United States Patent
Kondameedi et al.

(10) Patent No.: US 9,731,354 B2
(45) Date of Patent: Aug. 15, 2017

(54) CUTTING INSERT WITH MICRO-CHANNELS

(71) Applicant: Kennametal Inc., Latrobe, PA (US)

(72) Inventors: Naveen Kondameedi, Perrysburg, OH (US); Raouf Ben Amor, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 385 days.

(21) Appl. No.: 14/271,554

(22) Filed: May 7, 2014

(65) Prior Publication Data

US 2015/0321262 A1 Nov. 12, 2015

(51) Int. Cl.
*B23B 27/00* (2006.01)
*B23B 27/14* (2006.01)

(52) U.S. Cl.
CPC .......... *B23B 27/005* (2013.01); *B23B 27/145* (2013.01); *B23B 2200/086* (2013.01); *B23B 2200/128* (2013.01); *B23B 2200/242* (2013.01); *B23B 2200/325* (2013.01); *B23B 2200/3645* (2013.01); *B23B 2226/125* (2013.01); *B23B 2226/18* (2013.01); *B23B 2226/315* (2013.01); *B23B 2250/12* (2013.01); *Y10T 29/49996* (2015.01); *Y10T 407/24* (2015.01)

(58) Field of Classification Search
CPC ................ B23B 27/005; B23B 27/145; B23B 2200/086; B23B 2200/128; B23B 2250/12; B23B 2226/18; B23B 2226/125; B23B 2200/3645; B23B 2200/242; B23B 2226/315; B23B 2200/86; B23B 2200/87; B23B 2200/323; B23B 2200/325

USPC ........................................................ 407/11
See application file for complete search history.

(56) References Cited

U.S. PATENT DOCUMENTS

| | | | | | |
|---|---|---|---|---|---|
| 2,322,894 | A | * | 6/1943 | Stevens | B23B 51/02 408/230 |
| 3,395,434 | A | * | 8/1968 | Wirfelt | B23B 27/143 407/114 |
| 4,312,250 | A | * | 1/1982 | Yankoff | B23B 27/143 407/114 |
| 5,056,963 | A | * | 10/1991 | Kameno | B23B 27/145 29/90.01 |

(Continued)

FOREIGN PATENT DOCUMENTS

| | | | | |
|---|---|---|---|---|
| CN | 103084594 A | | 5/2013 | |
| CN | 102228998 B | | 7/2013 | |
| DE | 102009040577 | * | 4/2011 | ........... B23B 27/145 |

OTHER PUBLICATIONS

"Effect of Tool Geometry Variation on Finish Turning", Dogra et al. (Dec. 2010).

*Primary Examiner* — Sara Addisu
(74) *Attorney, Agent, or Firm* — Matthew S. Bedsole

(57) ABSTRACT

A cutting insert includes a body having an upper face, a lower face, a plurality of planar flank faces joining the upper and lower faces, and a plurality of curved flank faces joining the plurality of flank faces. A T-land is formed at a downward sloping angle with respect to the upper face. A cutting edge is formed at an intersection of a respective flank face and the T-land. A curved cutting edge is formed at an intersection of a respective curved flank face and the T-land. A micro-channel is formed in one of the flank faces, the curved flank faces and the T-land and proximate one of the cutting edge and the curved cutting edge.

15 Claims, 9 Drawing Sheets

(56) References Cited

U.S. PATENT DOCUMENTS

| | | | | |
|---|---|---|---|---|
| 5,074,720 | A * | 12/1991 | Loqvist | B23C 5/202 407/114 |
| 5,221,164 | A * | 6/1993 | Allaire | B23C 5/207 407/113 |
| 5,431,072 | A * | 7/1995 | Christoffel | B23P 15/30 407/119 |
| 5,525,016 | A * | 6/1996 | Paya | B23B 27/141 407/116 |
| 5,722,803 | A * | 3/1998 | Battaglia | B23B 27/146 407/115 |
| 5,967,710 | A * | 10/1999 | Krenzer | B23B 27/141 407/114 |
| 6,447,218 | B1 * | 9/2002 | Lagerberg | B23B 27/10 407/114 |
| 6,524,036 | B1 * | 2/2003 | Kolker | B23B 27/143 407/113 |
| 6,905,992 | B2 * | 6/2005 | Mehrotra | C04B 35/10 501/87 |
| 7,419,336 | B2 * | 9/2008 | Lehto | B23C 5/1045 407/113 |
| 8,845,243 | B2 * | 9/2014 | Hansson | B23B 27/1622 408/188 |
| 2001/0007215 | A1 * | 7/2001 | Murata | B23B 27/10 83/16 |
| 2004/0240949 | A1 * | 12/2004 | Pachao-Morbitzer | B23B 27/065 407/11 |
| 2007/0077130 | A1 * | 4/2007 | Ley | B23B 27/1607 407/114 |
| 2009/0274524 | A1 * | 11/2009 | Hidai | B24D 7/063 407/34 |
| 2012/0087751 | A1 * | 4/2012 | Yamaguchi | B23B 27/143 407/115 |

\* cited by examiner

CUTTING INSERT WITH MICRO-CHANNELS

BACKGROUND OF THE INVENTION

It is a continuing goal in the metal cutting industry to provide metal cutting inserts with an adopted cutting edge to the application that conserve its original geometry as long as possible. Chips (or swarf) is formed during a metal cutting operation. It has been found that the flow of chips against the rake face results in high temperatures leading to chemical wear. Crater wear can be formed proximate to the cutting edge, as shown in FIG. 9. As a result, the life of the cutting insert is reduced.

Another goal is to control the chip form. Short chips are preferred. Adequate rake face geometry would support chip forming and chip breakages.

SUMMARY OF THE INVENTION

The purpose of the invention is to minimize contact/friction surface, optimize cutting edge micro-geometry as well as chip forming, chip generation and chip breakage. This is accomplished by providing three-dimensional (3-D) elements or shapes on an area of the insert that is in contact with the workpiece and/or chip formed during a machining operation to optimize the behavior between the contact zones of the cutting insert and the workpiece and/or chip. As a result, lower mechanical and thermal load of the cutting tool and the cutting insert mounted thereon leads to a significant increase in tool life.

In one embodiment, the 3-D elements are in the form of micro-channels having at least one dimension in a range of between about 3 μm to about 100 μm. The cutting insert may be made of super hard materials, such as polycarbonate boron nitride (PcBN), polycarbonate diamond (PcD), ceramics, and the like, such that cutting forces, temperatures, work piece surface roughness are positively influenced, thereby resulting in an increase in tool life. The 3-D elements can be formed by erosive, laser or any other mechanical means, such as grinding, supersonic, and the like. The 3-D elements can be provided on any area of the cutting insert that may come into contact with the chips formed during a machining operation. For example, the 3-D elements may be provided on the chamfer, the rake face, the clearance face, or any combinations thereof.

In one aspect, a cutting insert comprises a body having an upper face, a lower face, a plurality of flank faces joining the upper and lower faces, and a plurality of curved flank faces joining the plurality of flank faces; a T-land formed at a downward sloping angle with respect to the upper face; a cutting edge formed at an intersection of a respective flank face and the T-land; a curved cutting edge formed at an intersection of a respective curved flank face and the T-land; and a micro-channel formed in one of the planar flank faces, the curved flank faces and the T-land and proximate one of the planar cutting edge and the curved cutting edge.

In another aspect, a method of fabricating a cutting insert comprising a body having an upper face, a lower face, a plurality of flank faces perpendicular to and joining the upper and lower faces, and a plurality of curved flank faces joining the plurality of flank faces; a T-land formed at a downward sloping angle with respect to the upper face; a cutting edge formed at an intersection of a respective flank face and the T-land; a curved cutting edge formed at an intersection of a respective curved flank face and the T-land, the method comprising creating a micro-channel proximate one of the cutting edge and the curved cutting edge by removing material from one of the flank faces, the curved flank faces and the T-land.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Figure 1:
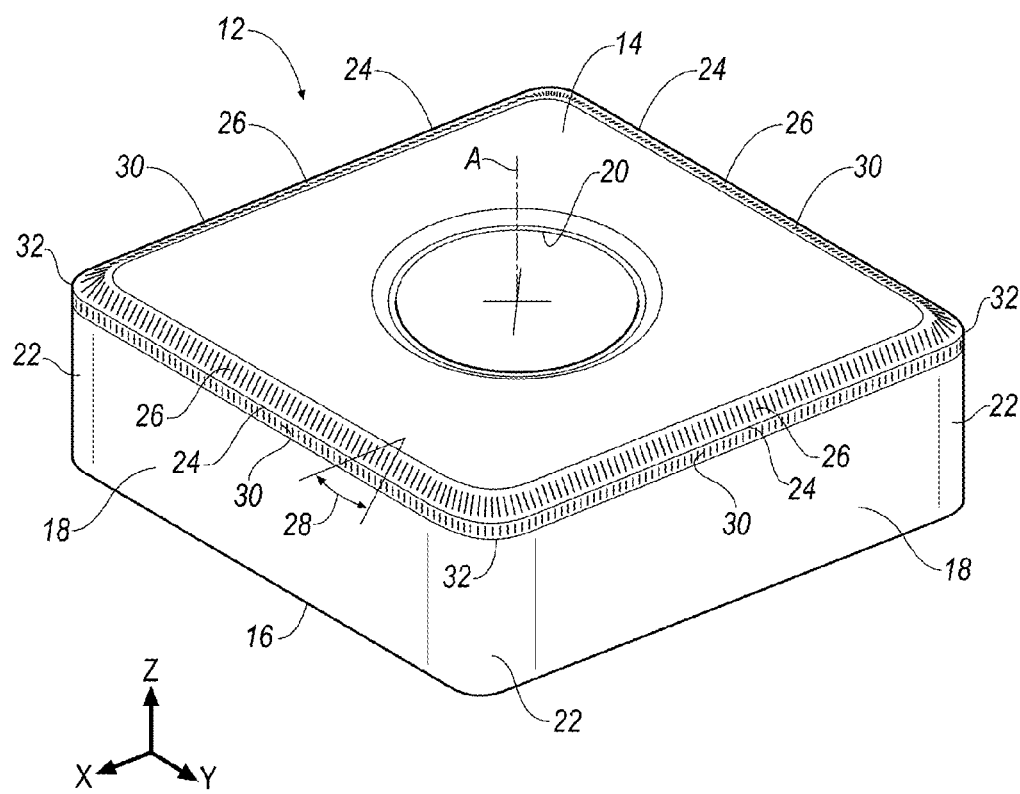
FIG. 1 is an isometric view of a cutting insert with micro-channels in accordance with an aspect of the invention.
Figure 2:
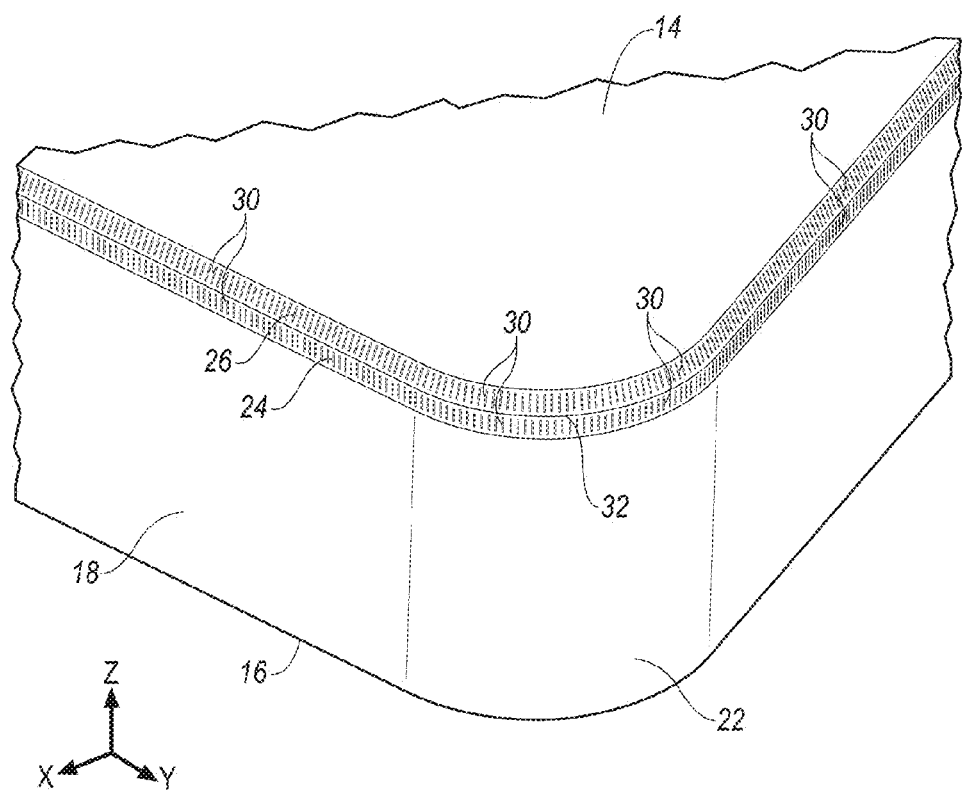
FIG. 2 is an enlarged, partial view of the curved cutting corner of the cutting insert shown in FIG. 1 in accordance with an aspect of the invention.
Figure 3:
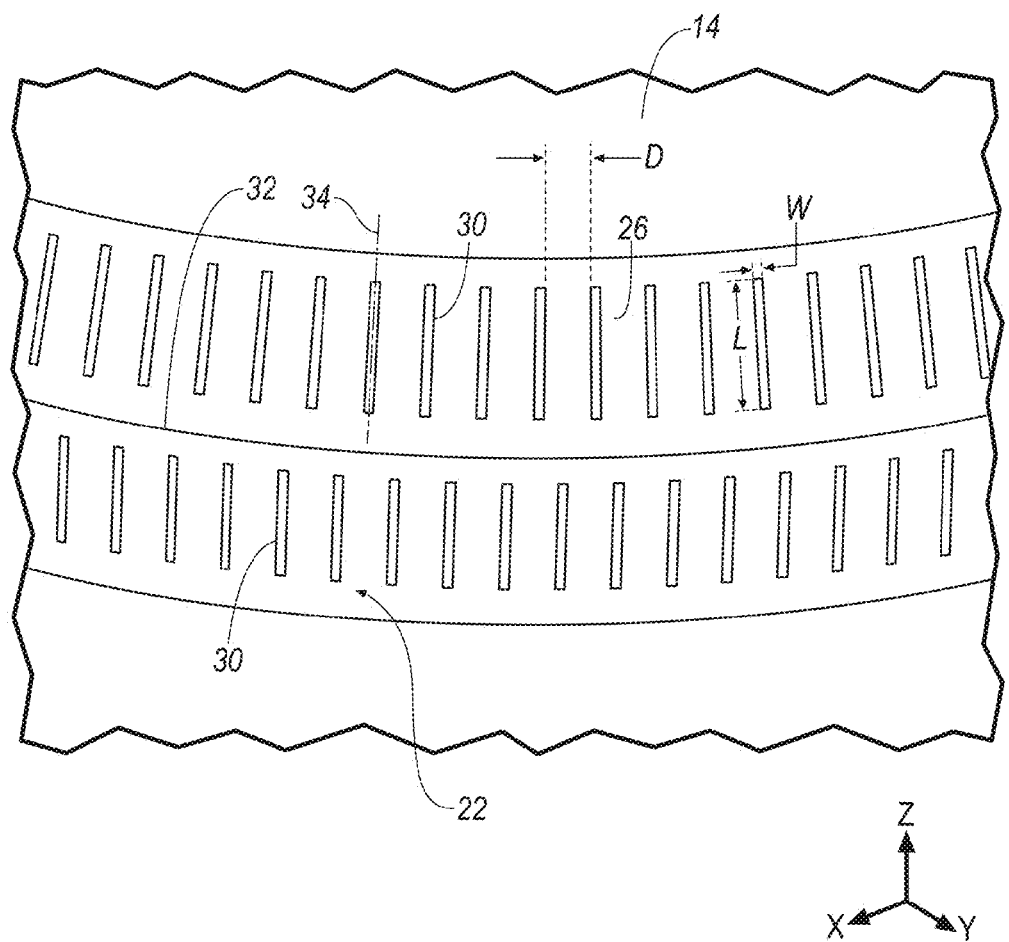
FIG. 3 is another enlarged, partial view of the curved cutting corner of the cutting insert shown in FIG. 1 in accordance with an aspect of the invention.

Referring now to FIGS. 1-3, a cutting insert is shown generally at 10 according to an embodiment of the invention. In general, the cutting insert 10 has a polygonal body 12 with a central axis, A, (i.e., parallel to the z-axis) extending therethrough. The body 12 has a substantially planar upper face 14, a substantially planar lower face 16, and a plurality of flank faces 18 perpendicular to and joining the upper and lower faces 14, 16. For the specific embodiment shown in the figures, a central pin receiving hole 20 is provided through the insert 10 for retention of the insert within a tool holder (not shown). In another embodiment, the cutting insert 10 does not include a hole therein for securing the cutting insert to a tool. Rather, the cutting insert 10 is retained in the tool by a clamping mechanism, which securely retains the cutting insert within the tool. Curved cutting edges 32 are formed at the intersections of the curved flank faces 22 and a respective T-land 26, while planar cutting edges 24 are respectively formed at the intersections of each planar flank face 18 and a respective T-land 26. The T-lands 26 are formed at a downward sloping angle 28 with respect to the upper face 14. The angle 28 can be, for example, between about five (5) degrees and about forty-five (45) degrees.

One aspect of the invention is that the cutting insert 10 includes one or more 3-D elements, shown generally at 30, that are formed in the flank faces 18, the curved cutting corners 22 and/or the T-lands 26. In the illustrated embodiment, the 3-D elements are in the form of micro-channels 30 that are formed in the flank faces, the curved cutting corners 22 and/or the T-lands 26 proximate the cutting edges 24. In other words, the micro-channels 30 are located on each side of the cutting edges 24. In one embodiment, the micro-channels 30 are located less than 5 microns from the cutting edge 24. However, it will be appreciated that the micro-channels 30 can be located only in the flank faces 18, only in the curved cutting corners 22, or only in the T-lands 26 in one or more sides of the cutting insert 10.

As shown in FIGS. 2 and 3, the micro-channels 30 are generally rectangular in shape having a longitudinal axis, 34, a length, L, and a width, W. It has been shown by the inventors that the crater-like structure of the micro-channels 30 reduces the contact area between the chips and the cutting insert 10. As a result, heat transfer between the chips and the cutting insert 10 is increased, thereby minimizing crater formation in the proximity of the cutting edges 24.

In the illustrated embodiment, the longitudinal axis 34 of each micro-channel 30 is generally perpendicular to the cutting edges 24. However, it should be appreciated that the micro-channels 30 can be oriented at any desirable angle on the flank faces 18, the curved cutting corners 22, and the T-land 26. As shown in FIG. 3, the length, L, of each micro-channel 30, which is less than equal to about 100 microns, is much greater than the width, W. The depth of the micro-channel 30 can be less than or equal to about 0.01 mm. In one embodiment, the length, L, is about five (5) times greater than the width, W. In another embodiment, the length, L, is about ten (10) times greater than the width, W. In yet another embodiment, the length, L, is about twenty-five (25) times greater than the width, W. In still yet another embodiment, the length, L, is about fifty (50) times greater than the width, W. In other words, the length, L, can be between about five (5) to fifty (50) times greater than the width, W. The micro-channels 30 can be formed by using means well-known in the art, such as laser, electron beam, and the like.

In the illustrated embodiment, the micro-channels 30 are separated by a distance, D, with respect to each other. In one embodiment, the micro-channels 30 are equidistant from each other. However, it will be appreciated that the distance, D, between micro-channels 30 can vary. For example, the distance, D, can be smaller for the micro-channels 30 formed in the curved cutting corners 22 than the micro-channels 30 formed in the flank faces 18. Conversely, the distance, D, can be greater for the micro-channels 30 formed in the curved cutting corners 22 than the micro-channels 30 formed in the flank faces 18. In another embodiment, the distance, D, between the micro-channels 30 formed in the flank faces 18 varies, while the distance, D, between the micro-channels 30 formed in the curved cutting corners 22 are equidistant. One skilled in the art would understand that the distance, D, between the micro-channels 30 can vary in several different ways.

Figure 4:
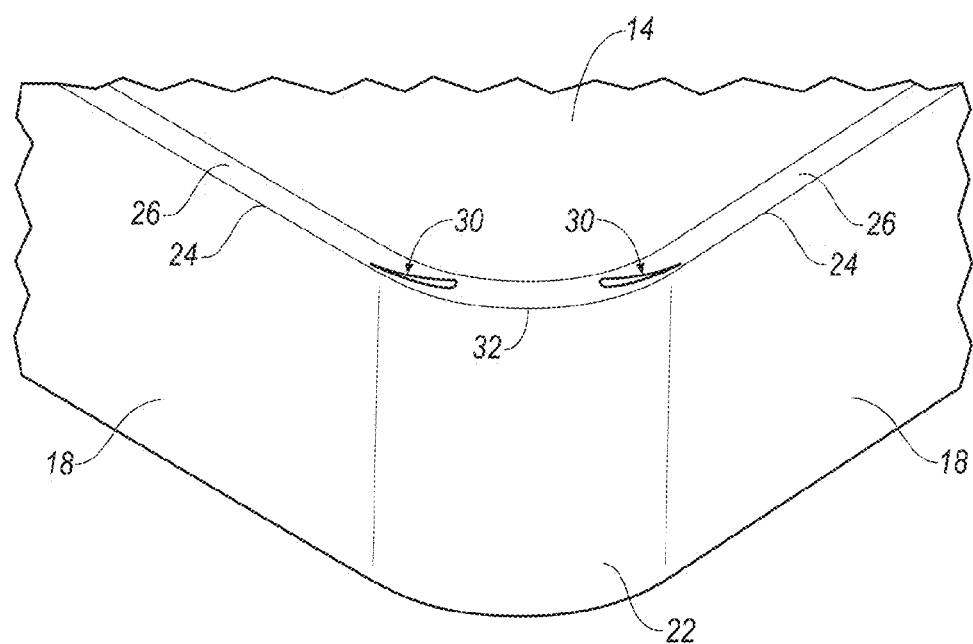
FIG. 4 an enlarged, partial view of the curved cutting corner of the cutting insert with tear-drop shaped micro-channels in accordance with an aspect of the invention.
Figure 5:
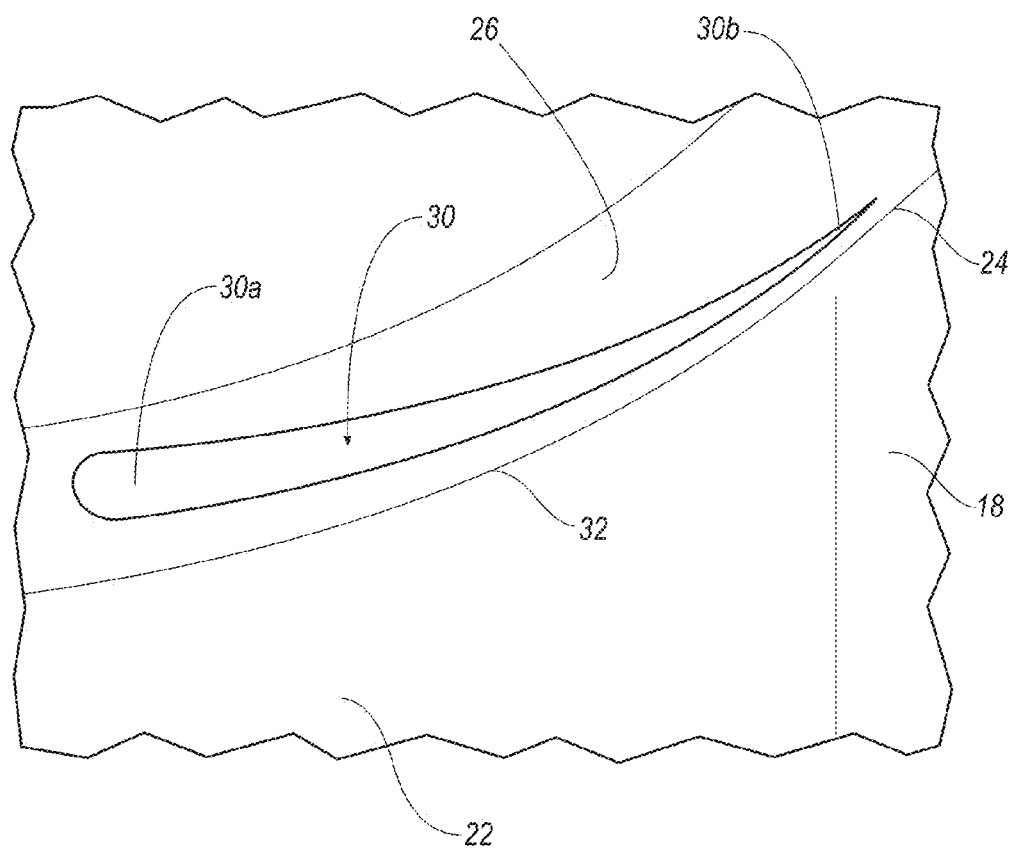
FIG. 5 is another enlarged, partial view of the curved cutting corner of the cutting insert shown in FIG. 4 in accordance with an aspect of the invention.

As mentioned above, the 3-D elements 30 can be of any shape and located in one or more of the flank faces 18, one or more of the curved cutting corners 22, and/or one or more of the T-lands 26. For example, the 3-D elements can be in the form of a tear-drop shaped micro-channel 30 with a head portion 30a and a tail portion 30b. In this embodiment, the micro-channel 30 is oriented substantially parallel to the curved cutting edges 32 such that a head portion 30a of the tear-drop shaped micro-channel 30 is located in the T-land 26 proximate the curved cutting edge 32 and a tail portion 30b of the micro-channel 30 is located in the T-land 26 proximate the planar cutting edge 24, as shown in FIGS. 4 and 5. However, it should be appreciated that the micro-channels 30 can be oriented at any desirable angle on the flank faces 18, the curved cutting corners 22, and/or the T-land 26.

More specifically, the head portion 30a of each micro-channel 30 is located at a greater distance from the curved cutting edge 32 than the tail portion 30b. It should be appreciated that the entire micro-channel 30 can be located in the T-land 26 proximate the curved cutting edge 32 such that the tail portion 30b does not extend into the T-land 26 proximate the planar cutting edge 24. In addition, it should be appreciated that the head portion 30a of the micro-channel 30 can be closer to the curved cutting edge 32 than the tail portion 30b of the micro-channel 30. Further, the tear-drop shaped micro-channel 30 can be located proximate and parallel to the cutting edges 24. In doing so, the 3-D elements 30 result in the cutting edges 24 to become an additional secondary cutting edge that can be used in case of advanced wear or chipping of the primary curved cutting edges 32.

Figure 6:
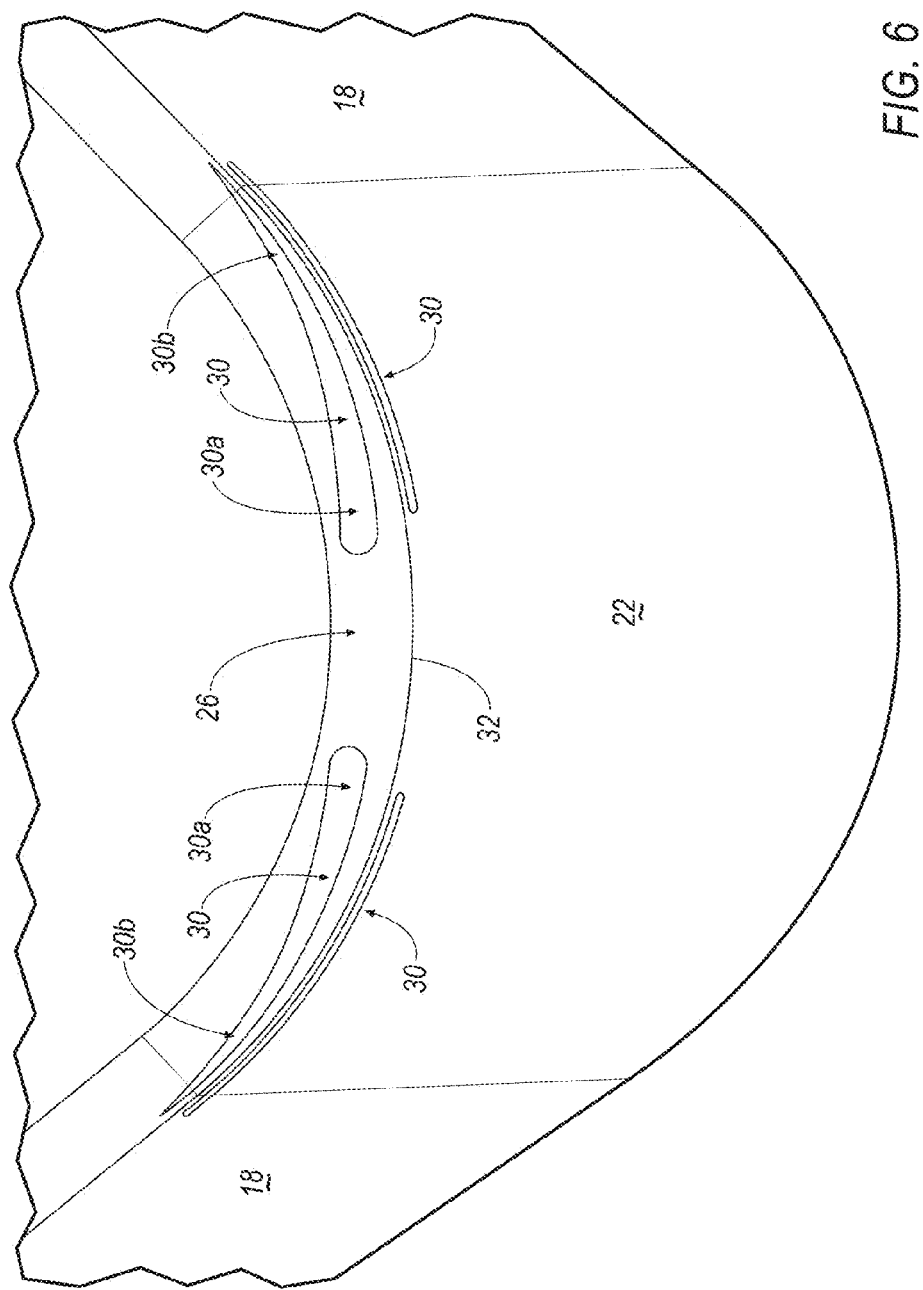
FIG. 6 is another enlarged, partial view of the curved cutting corner of the cutting insert shown in FIG. 4 in accordance with another aspect of the invention.

Referring now to FIG. 6, the cutting insert 10 shown in FIG. 5 can also include a micro-channel 30 located on the opposite side of the curved cutting edge 32. In the illustrated embodiment, the micro-channel 30 has approximately the same length as the tear-drop shaped micro-channel 30. However, it will be appreciated that the micro-channel 30 can have a different length, a different width or a different length and width than the tear-drop shaped micro-channel 30.

Figure 7:
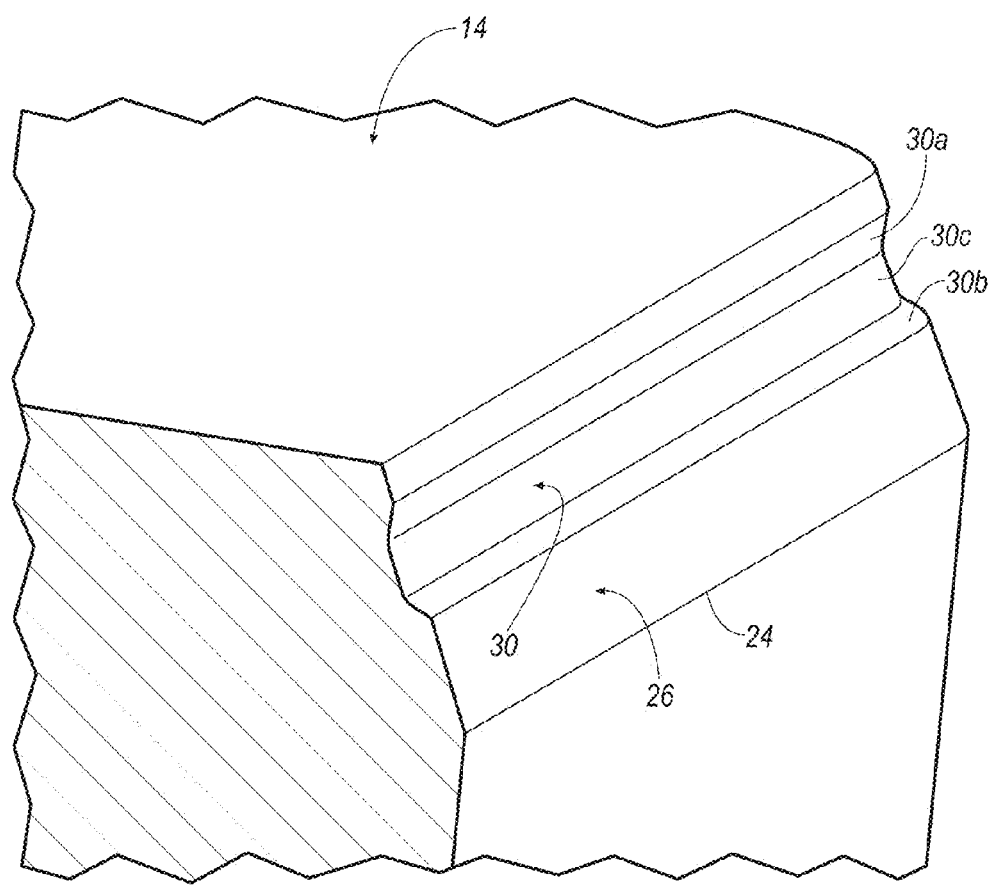
FIG. 7 is an enlarged, partial cross sectional view of the planar cutting edge of the cutting insert with a micro-channel in the form of a negative feature in accordance with another aspect of the invention.

In another embodiment, the micro-channel 30 can be in the form of a negative feature formed in the T-land 26 proximate the planar cutting edge 24, as shown in FIG. 7. The negative feature 30 is lower in elevation than the T-land 26 and includes a pair of opposing side walls 30a, 30b and a bottom surface 30c. The negative feature 30 minimizes the contact area between the chip and the cutting insert 10.

Figure 8:
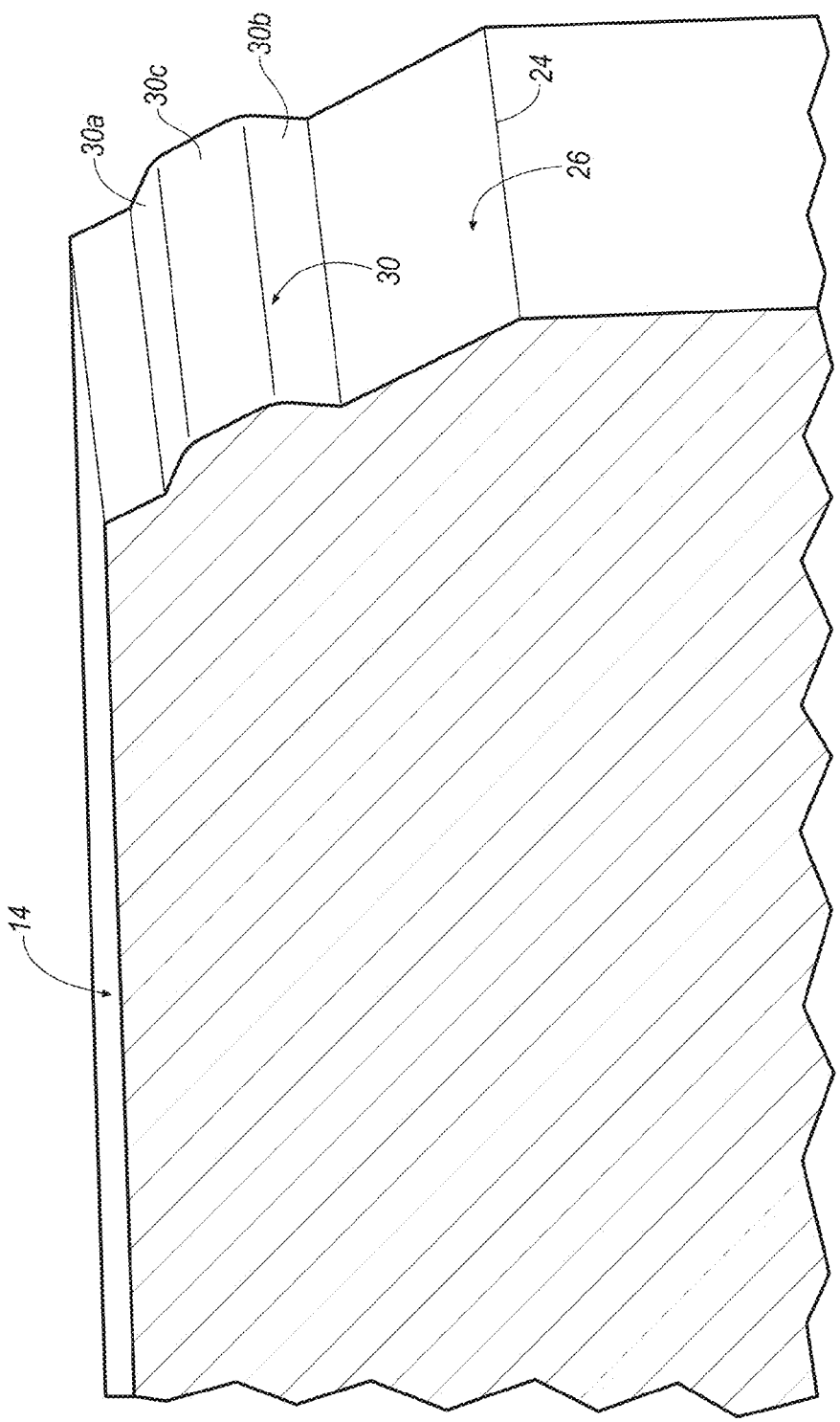
FIG. 8 is an enlarged, partial cross sectional view of the planar cutting edge of the cutting insert with a micro-channel in the form of a positive feature in accordance with another aspect of the invention.
Figure 9:
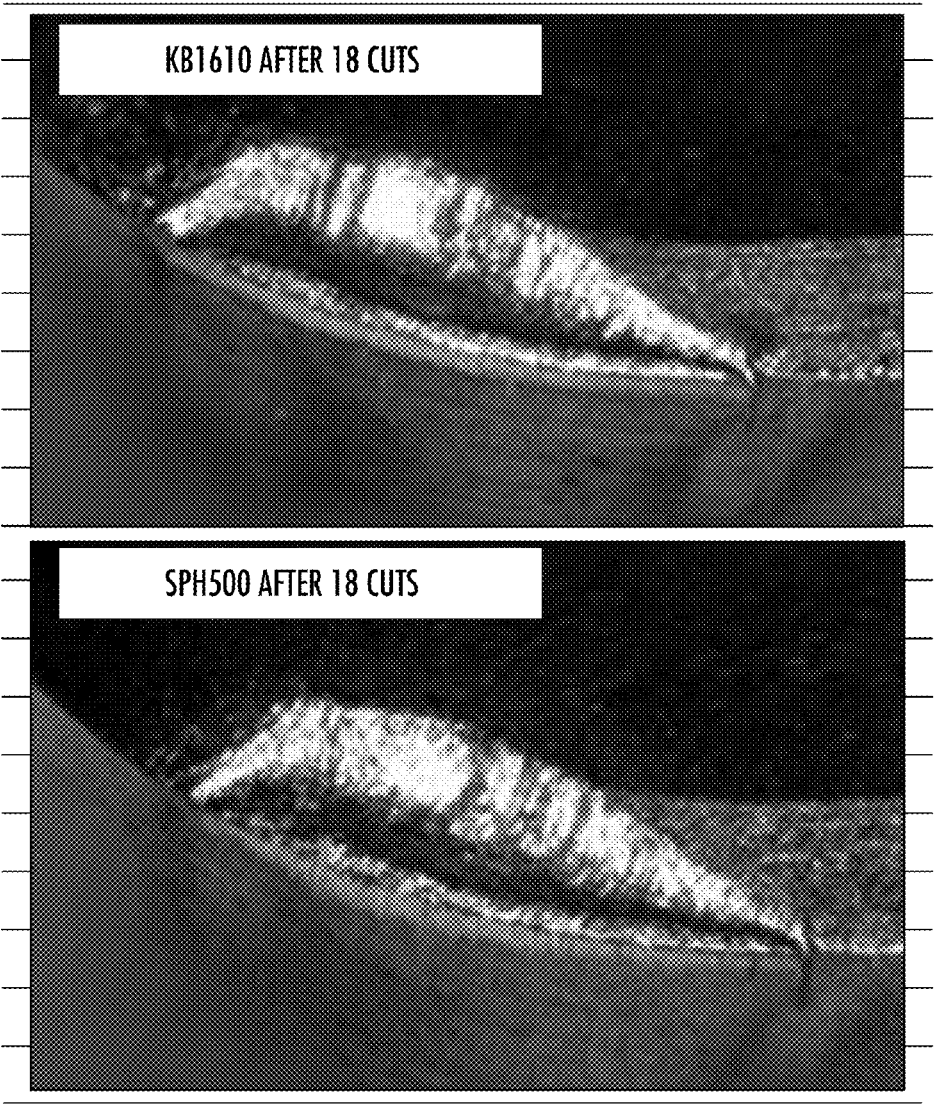
FIG. 9 is a photo micrograph of a crater formed proximate a cutting edge of a conventional cutting insert due to high temperature chip flow.

In yet another embodiment, the micro-channel 30 can be in the form of a positive feature formed in the T-land 26 proximate the cutting edge 24, as shown in FIG. 8. The positive feature 30 is higher in elevation than the T-land 26 and includes a pair of opposing sidewalls 30a, 30b and a top surface 30c. The positive feature 30 minimizes the contact area between the chip and the cutting insert 10.

As described above, the micro-channels 30 create a ventilated ridge for the chip to flow, thereby minimizing the contact area between the chip and the cutting insert 10. As a result, the amount of heat generated by the chip during metal cutting operations is decreased due to the reduced contact area, thereby improving chip flow. In addition, wear on both the flank faces 18 and the T-land 26 is decreased due to the reduction in the maximum temperature near the cutting edges 24, 32, thereby significantly improving the life of the cutting insert 10. In addition, chip form is controlled by the micro-channels 30.

The patents and publications referred to herein are hereby incorporated by reference.

Having described presently preferred embodiments the invention may be otherwise embodied within the scope of the appended claims.

What is claimed:

1. A cutting insert, comprising:
a body having an upper face, a lower face, a plurality of flank faces joining the upper and lower faces, and a plurality of curved flank faces joining the plurality of flank faces; a T-land formed at a downward sloping angle with respect to the upper face; a cutting edge formed at an intersection of a respective flank face and the T-land; a curved cutting edge formed at an intersection of a respective curved flank face and the T-land; and
a micro-channel formed in one of the flank faces, the curved flank faces and the T-land proximate one of the cutting edge and the curved cutting edge, the micro channel having a length L, a width, W, and a depth;
wherein at least one of the length, L, and the width, W, is in a range of between 3 µm and 100 µm; and
wherein the depth, of the micro channel is less than or equal to 0.01 mm.

2. The cutting insert of claim 1, further comprising at least one micro-channel formed in both the flank faces and the T-land.

3. The cutting insert of claim 1, further comprising at least one micro-channel formed in all the flank faces, the curved flank faces and the T-land.

4. The cutting insert of claim 1, further comprising at least one micro-channel formed only in the flank face proximate the cutting edge.

5. The cutting insert of claim 1, further comprising at least one micro-channel formed only in the curved flank face proximate to the curved cutting edge.

6. The cutting insert of claim 1, further comprising at least one micro-channel formed only in the T-land proximate the curved cutting edge.

7. The cutting insert of claim 1, further comprising at least one micro-channel formed only in the T-land proximate the cutting edge.

8. The cutting insert of claim 1, wherein the micro-channel is rectangular in shape having a longitudinal axis.

9. The cutting insert of claim 8, wherein the length, L, is between 5-50 times greater than the width, W.

10. The cutting insert of claim 8, wherein the longitudinal axis is perpendicular to one of the planar cutting edge and the curved cutting edge.

11. The cutting insert of claim 1, wherein the micro-channel is tear-drop in shape having a head portion and a tail portion.

12. The cutting insert of claim 11, wherein the head portion is located at a greater distance from the curved cutting edge than the tail portion.

13. The cutting insert of claim 1, wherein the micro-channel is in the form of a negative feature formed on the T-land, the negative feature being lower in elevation than the T-land and including a pair of opposing side walls and a bottom surface.

14. The cutting insert of claim 1, wherein the micro-channel is in the form of a positive feature formed on the T-land, the positive feature being higher in elevation than the T-land and including a pair of opposing side walls and a top surface.

15. A cutting insert, comprising:
a body having an upper face, a lower face, a plurality of flank faces joining the upper and lower faces, and a plurality of curved flank faces joining the plurality of flank faces; a T-land formed at a downward sloping angle with respect to the upper face; a cutting edge formed at an intersection of a respective flank face and the T-land; a curved cutting edge formed at an intersection of a respective curved flank face and the T-land; and
a micro-channel formed in one of the flank faces, the curved flank faces and the T-land proximate one of the cutting edge and the curved cutting edge, the micro channel having a length L, a width, W, and a depth;
wherein at least one of the length, L, and the width, W, is in a range of between 3 µm and 100 µm; and
wherein the depth, of the micro channel is less than or equal to 0.01 mm; and
wherein the cutting insert is made of a superhard material selected from the group consisting of polycarbonate boron nitride, polycarbonate diamond, and ceramics.

* * * * *